US011077713B2

United States Patent
Hikita et al.

(10) Patent No.: US 11,077,713 B2
(45) Date of Patent: Aug. 3, 2021

(54) TIRE

(71) Applicant: Sumitomo Rubber Industries, Ltd., Kobe (JP)

(72) Inventors: Masahiro Hikita, Kobe (JP); Kyosuke Kono, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 352 days.

(21) Appl. No.: 16/298,674

(22) Filed: Mar. 11, 2019

(65) Prior Publication Data
US 2019/0275839 A1    Sep. 12, 2019

(30) Foreign Application Priority Data
Mar. 12, 2018    (JP) .............................. JP2018-044396

(51) Int. Cl.
*B60C 9/18*    (2006.01)
*B60C 9/22*    (2006.01)
*B60C 9/20*    (2006.01)

(52) U.S. Cl.
CPC .............. *B60C 9/1835* (2013.01); *B60C 9/18* (2013.01); *B60C 9/1807* (2013.01); *B60C 9/20* (2013.01); *B60C 9/2204* (2013.01); *B60C 2009/1842* (2013.01); *B60C 2009/2035* (2013.01); *B60C 2009/2087* (2013.01); *B60C 2200/10* (2013.01)

(58) Field of Classification Search
CPC ........... B60C 9/18; B60C 9/1807; B60C 9/20; B60C 2009/2012; B60C 2009/2035; B60C 2009/2041
See application file for complete search history.

(56) References Cited

U.S. PATENT DOCUMENTS

2017/0144485 A1*    5/2017 Muthigi .................... B60C 9/18

FOREIGN PATENT DOCUMENTS

| EP | 416893 | * | 1/1994 |
| JP | 2015-174569 A | | 10/2015 |
| WO | WO 2015/083441 | * | 6/2015 |

* cited by examiner

*Primary Examiner* — Justin R Fischer
(74) *Attorney, Agent, or Firm* — Birch, Stewart, Kolasch & Birch, LLP (57) ABSTRACT

A tire comprises a tread reinforcing layer comprising a cord-reinforced part formed by winding a rubberized cord strip with at least one reinforcing cord covered with a topping rubber. The cord-reinforced part includes a mesh part in which first inclined segments and second inclined segments of the rubberized cord strip are inclined to opposite directions with respect to the tire circumferential direction. The first inclined segments intersect the second inclined segments, leaving space parts each having a quadrilateral shape. The mesh part has a tire-equator-side first region, a tread-edge-side second region and a third region therebetween, wherein the space parts within the tire-equator-side first region each have an area A1, the space parts within the tread-edge-side second region each have an area A2, and the space parts within the third region each have an area A3 which is smaller than the area A1 and larger than the area A2.

20 Claims, 6 Drawing Sheets

TIRE

TECHNICAL FIELD

The present invention relates to a tire having a tread reinforcing layer.

BACKGROUND ART

Patent Document 1 below describes a pneumatic tire comprising a tread reinforcing band. This band is formed from a rubberized cord strip, wherein first main segments in which the rubberized cord strip is included to one direction with respect to the circumferential direction, and second main segments in which the rubberized cord strip is included to one direction opposite to the first main segments with respect to the circumferential direction. The first main segments intersect the second main segments so as to form a mesh structure. Of the intersecting first and second main segments, the radially outer main segments restrain the radially inner main segments. As a result, the tread reinforcing band is increased in the rigidity to produces a large cornering power. Thus, the cornering performance is improved.

Patent Document 1: Japanese Patent Application Publication® No. 2015-174569

SUMMARY OF THE INVENTION

Problems to be Resolved by the Invention

In general, the force acting on the tread of a tire from the ground during cornering (centripetal force) becomes higher in a tread edge side than in a tire equator side.

In the tread reinforcing band disclosed in Patent Document 1, however, such difference in the magnitude of the force acting on the tread during cornering was not taken into consideration. Thus, there is room for improvement in the cornering performance.

It is therefore, an object of the present invention to provide a tire capable of improving cornering performance.

According to the present invention, a tire comprises
a toroidal carcass, and
a tread reinforcing layer disposed radially outside the carcass in a tread portion, and comprising a cord-reinforced part formed by winding a rubberized cord strip with at least one reinforcing cord covered with a topping rubber, wherein
the cord-reinforced part includes a mesh part in which the rubberized cord strip comprises first inclined segments and second inclined segments,
the first inclined segments incline toward one side with respect to the tire circumferential direction,
the second inclined segments incline to the opposite direction to the first inclined segments with respect to the tire circumferential direction,
side edges of the first inclined segments are arranged not to contact with one another,
side edges of the second inclined segments are arranged not to contact with one another, and
the first inclined segments intersect the second inclined segments, leaving space parts each having a quadrilateral shape,
the mesh part has a tire-equator-side first region, a tread-edge-side second region and a third region therebetween, wherein the space parts within the tire-equator-side first region each have an area A1, the space parts within the tread-edge-side second region each have an area A2, and the space parts within the third region each have an area A3 smaller than the area A1 and larger than the area A2 (namely, A1>A3>A2).

In general, in order for light maneuverability which is easiness of steering wheel operation during cornering, it is desirable to increase shear stress in tread-edge-side regions of the tread portion than in a tire-equator-side region as the tread-edge-side regions are subjected to a larger force than the tire-equator-side region.

In a tire having a large restraining force, radially outward deformation of the rubberized cord strip and the carcass can be suppressed, thereby the uniformity in the circumferential direction is improved. Thus, the tire uniformity is improved.

Since the number of intersections where the first inclined segments intersect the second inclined segments is larger in the region having the space parts having the smaller area than in the region having the space parts having the larger area, the shear stress and the force of constraint become larger in the tread-edge-side region than in the tire-equator-side region. For this reason, the light maneuverability is enhanced and the tire uniformity is improved. Therefore, the tire of the present invention has excellent cornering performance.

In the tire according to the present invention, it is preferable that the angles of the first inclined segments and the second inclined segments with respect to the tire circumferential direction are in a range from 1 to 15 degrees.

In the tire according to the present invention, it is preferable that in the mesh part, the rubberized cord strip comprises circumferential segments extending in the tire circumferential direction and arranged in one of edge portions in the tire axial direction of the mesh part, and each of the circumferential segments is connected to one of the first inclined segments and one of the second inclined segments.

In the tire according to the present invention, it is preferable that in the mesh part, the rubberized cord strip comprises circumferential segments extending in the tire circumferential direction and arranged in each of edge portions in the tire axial direction of the mesh part, and each of the circumferential segments is connected to one of the first inclined segments and one of the second inclined segments.

In the tire according to the present invention, it is preferable that with respect to the first inclined segment and the second inclined segment connected with the circumferential segment, the angle of the first inclined segment with respect to the circumferential segment is different from the angle of the second inclined segment with respect to the circumferential segment.

In the tire according to the present invention, it is preferable that the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

In the tire according to the present invention, it is preferable that the tread portion comprises a crown region including a tire equator, two middle regions disposed on both sides of the crown region, and two shoulder regions respectively disposed axially outside the two middle regions, the mesh part is disposed in each of the middle regions, and the cord-reinforced part includes a first spiral part in which the rubberized cord strip extends substantially in a spiral manner and which is disposed in the crown region, and a second spiral part in which the rubberized cord strip extends substantially in a spiral manner and which is disposed in each of the shoulder regions.

DESCRIPTION OF THE PREFERRED EMBODIMENTS

The present invention can be applied to pneumatic tires and non-pneumatic tires in various categories such as for passenger cars, motorcycles, heavy duty vehicles, etc.

Taking a pneumatic tire for motorcycles as an example, embodiments of the present invention will be described in conjunction with accompanying drawings.

Figure 1:
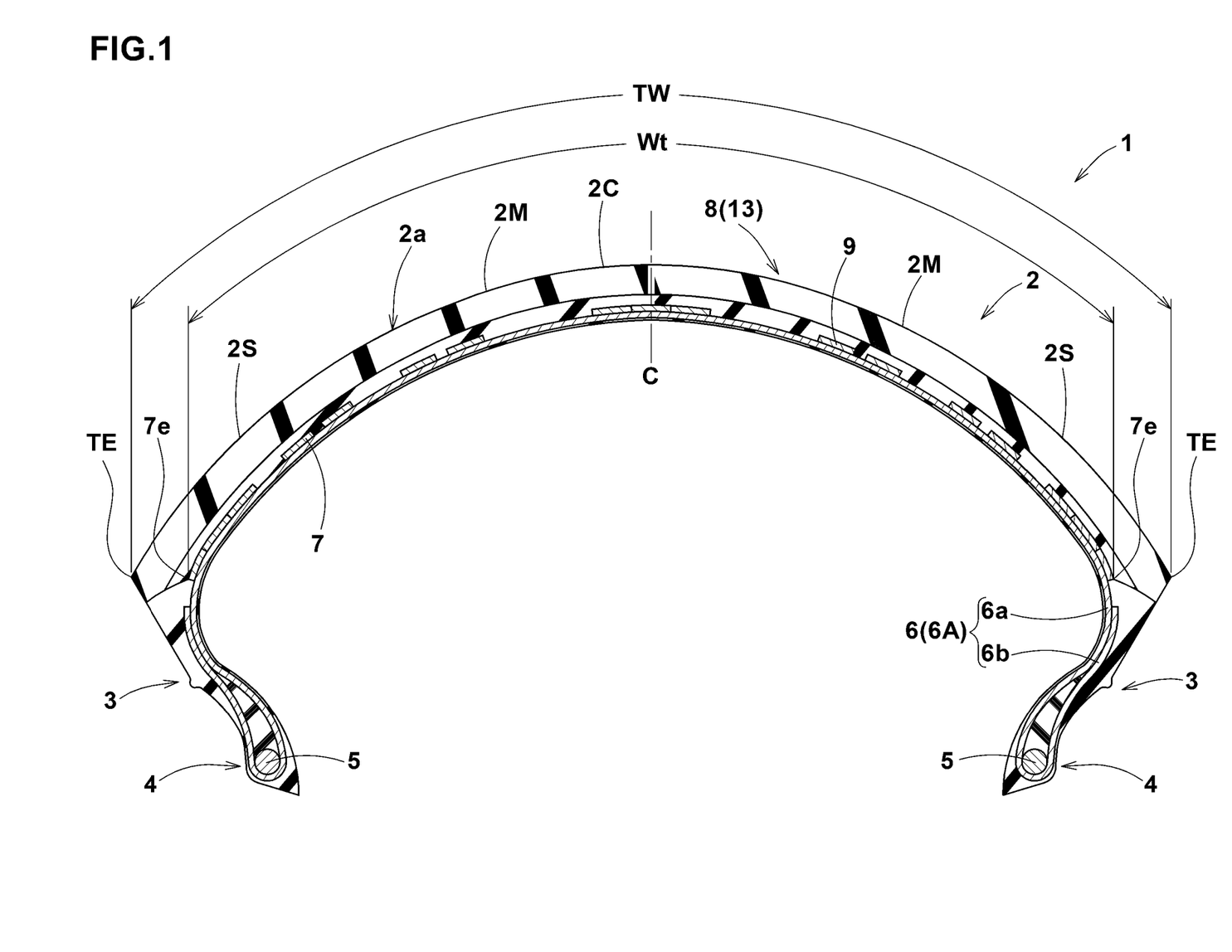
FIG. 1 is a sectional view of a tire as an embodiment of the present invention.

FIG. 1 shows a pneumatic tire 1 for a motorcycle as an embodiment of the present invention.

In FIG. 1, there is shown a tire meridian section including the tire rotational axis (not shown) of the tire 1 in its normally inflated unloaded condition.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

In this application including specification and claims, various dimensions, positions and the like of a pneumatic tire refer to those under a normally inflated unloaded condition of the tire unless otherwise noted.

As shown in FIG. 1, the tire 1 in the present embodiment comprises a tread portion 2 having a tread surface 2a contacting with the ground, a pair of sidewall portions 3, a pair of bead portions 4, a carcass 6 extending between the bead portions 4 through the tread portion 2 and sidewall portions 3, and a tread reinforcing layer 7 disposed radial outside the carcass 6 in the tread portion 2.

The tread portion 2 is curved in an arc shape protruding outwardly in the tire radial direction so that the maximum cross section width of the tire occurs between the tread edges TE.

The tread portion 2 comprises a crown region 2C including tire equator C, a pair of shoulder regions 2s respectively including the tread edges TE, and a pair of middle regions 2M between the shoulder regions 2s and the crown region 2C. The crown region 2C is a region contacting with the ground mainly during running straight without substantially leaning the motorcycle. The middle regions 2M are regions contacting with the ground when the motorcycle is leant to initiate turn and during cornering. The shoulder regions 2s are regions contacting with the ground when the motorcycle is fully leant during cornering.

The carcass 6 is composed of at least one carcass ply 6A. The carcass ply 6A is formed from carcass cords rubberized with topping rubber and arranged at an angle of from 75 to 90 degrees with respect to the tire equator C.

The carcass ply 6A comprises, for example, a main portion 6a extending between the bead portions 4 through the tread portion 2 and the sidewall portions 3, and a pair of turned up portions 6b continued from the main portion 6a and turned up around bead cores 5 disposed in the respective bead portions 4.

In the tire meridian section, the tread reinforcing layer 7 curves along the tread portion 2 and extends over substantially the entire width of the tread portion 2. As a result, the tread reinforcing layer 7 increases the stiffness of the tread portion 2 over the entire tread portion 2. From such a viewpoint, it is preferable that the width wt of the tread reinforcing layer 7 measured along the tread surface 2a is set in a range from 75% to 95% of the developed tread width TW measured between the tread edges TE along the tread surface 2a.

The tread reinforcing layer 7 comprises a cord-reinforced part 8 formed by winding a rubberized cord strip 9 around the carcass 6.

Figure 2:
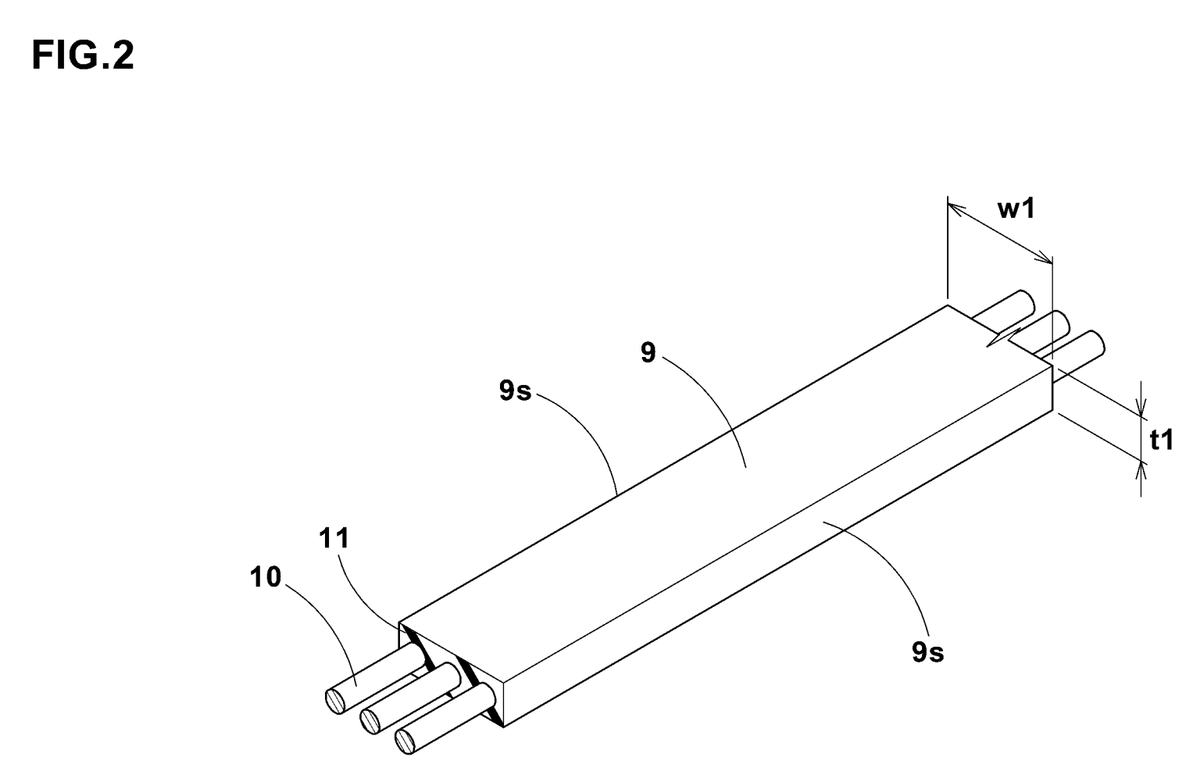
FIG. 2 is a perspective view showing a rubberized cord strip.

An example of such rubberized cord strip 9 is shown in FIG. 2.

The rubberized cord strip 9 is a strip or tape of a topping rubber 11 in which at least one reinforcing cord 10 is embedded along the length thereof.
In this example, a plurality of parallel reinforcing cords 10 are embedded as shown in FIG. 2.

For the reinforcing cords 10, steel cords and aramid fiber cords can be suitably used, for example.

The rubberized cord strip 9 in this example has a substantially rectangular cross-sectional shape, and has side edges 9s extending in the longitudinal direction.

It is desirable that the width w1 of the rubberized cord strip 9 is, for example, set in a range from 2.5 to 12.0 mm.

It is desirable that the thickness t1 of the rubberized cord strip 9 is, for example, set in a range from 0.6 to 3.0 mm.

The reinforcing cords 10 are arranged side-by-side in the widthwise direction and extend in parallel with the side edges 9s.

The cord-reinforced part 8 includes a mesh part 13 in which the rubberized cord strip 9 intersects with itself as shown in FIG. 1.

In the present embodiment, the mesh part 13 is located in each of the middle regions 2M.

Figure 3:
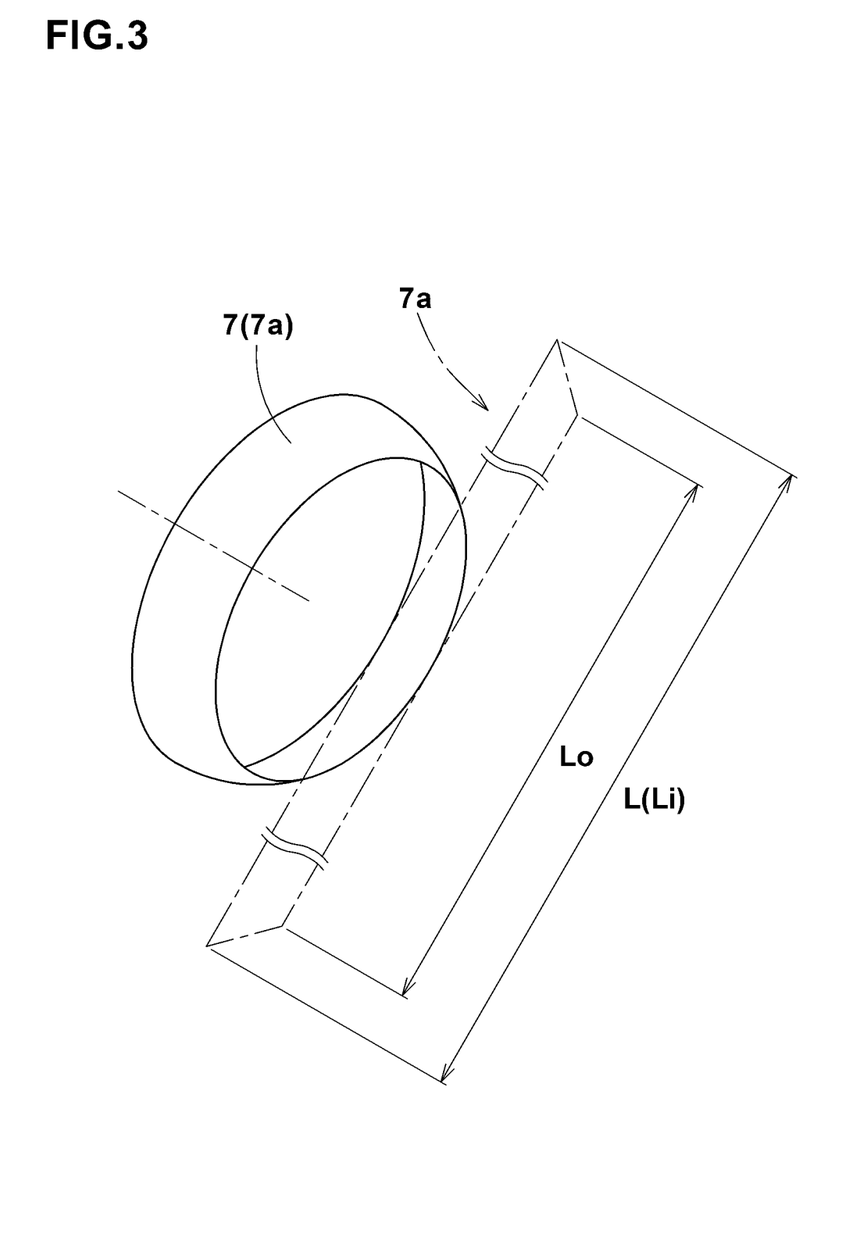
FIG. 3 is a perspective view conceptually showing a state before developing of a part of a tread reinforcing layer of the present embodiment.

FIG. 3 is a perspective view schematically showing a part 7a of the tread reinforcing layer 7 which part is disposed on one side of the tire equator C.

In the tread portion 2 of the tire 1 for a motorcycle, the radius of curvature of the tread surface 2a in the tire meridian section is relatively small as compared with tires in other categories. Accordingly, in the part 7a of the tread reinforcing layer 7, its circumferential length L gradually decreases from the tire equator C side toward the tread edges TE side, and the circumferential length Lo at its edge on the tread edges TE side becomes smaller than the circumferential length Li at its edge on the tire equator C side as shown in FIG. 3.

Figure 4:
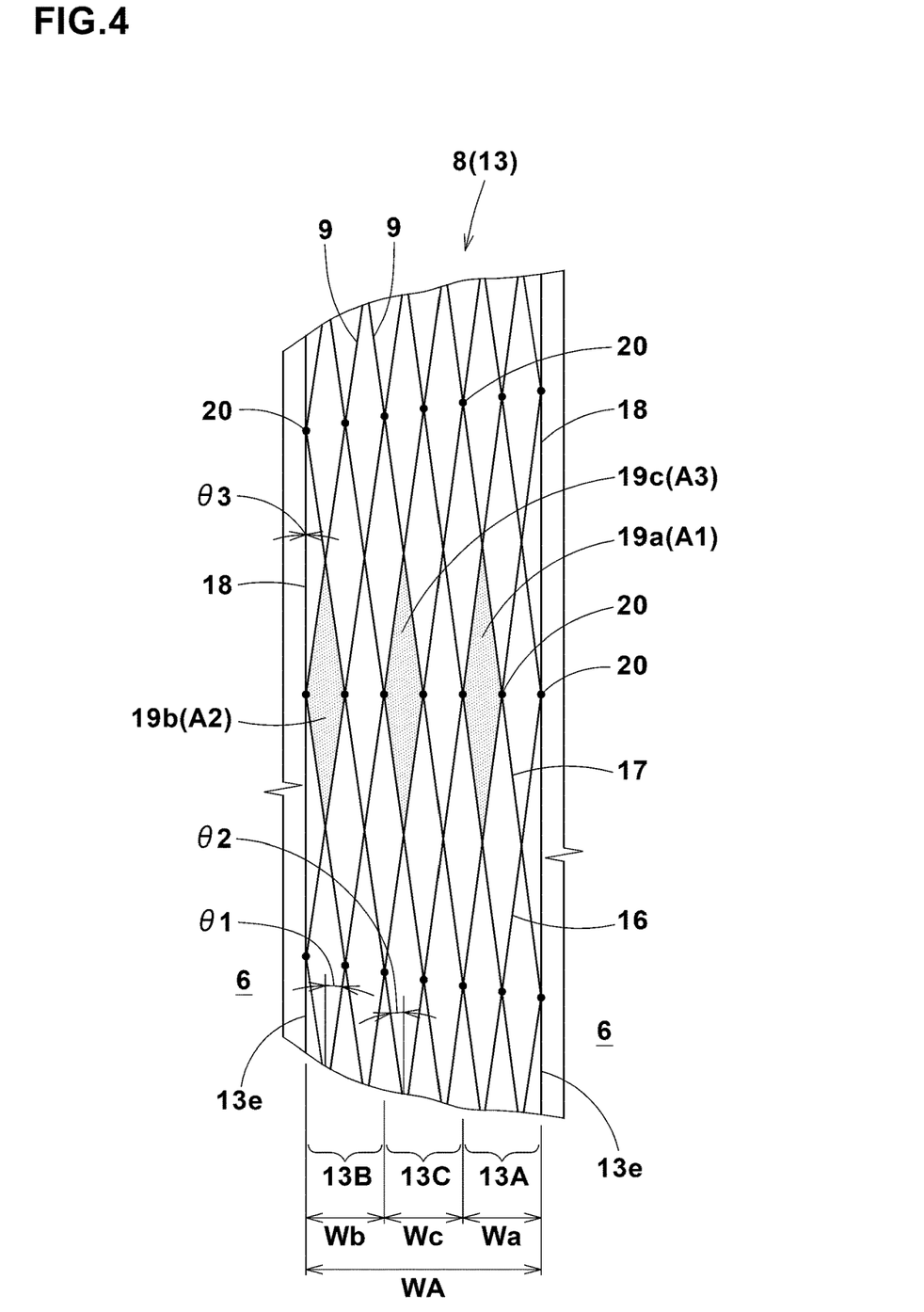
FIG. 4 is a developed schematic partial view of the mesh part of the present embodiment.

FIG. 4 is a developed partial view of the mesh part 13. The mesh part 13 comprises a plurality of first inclined segments 16 and a plurality of second inclined segments 17 of the rubberized cord strip 9.

The first inclined segments 16 are inclined with respect to the tire circumferential direction in one direction (diagonally right up in FIG. 4). The second inclined segments 17 are inclined with respect to the tire circumferential direction in the opposite direction to the first inclined segments 16 (diagonally right down in FIG. 4).

Figure 5:
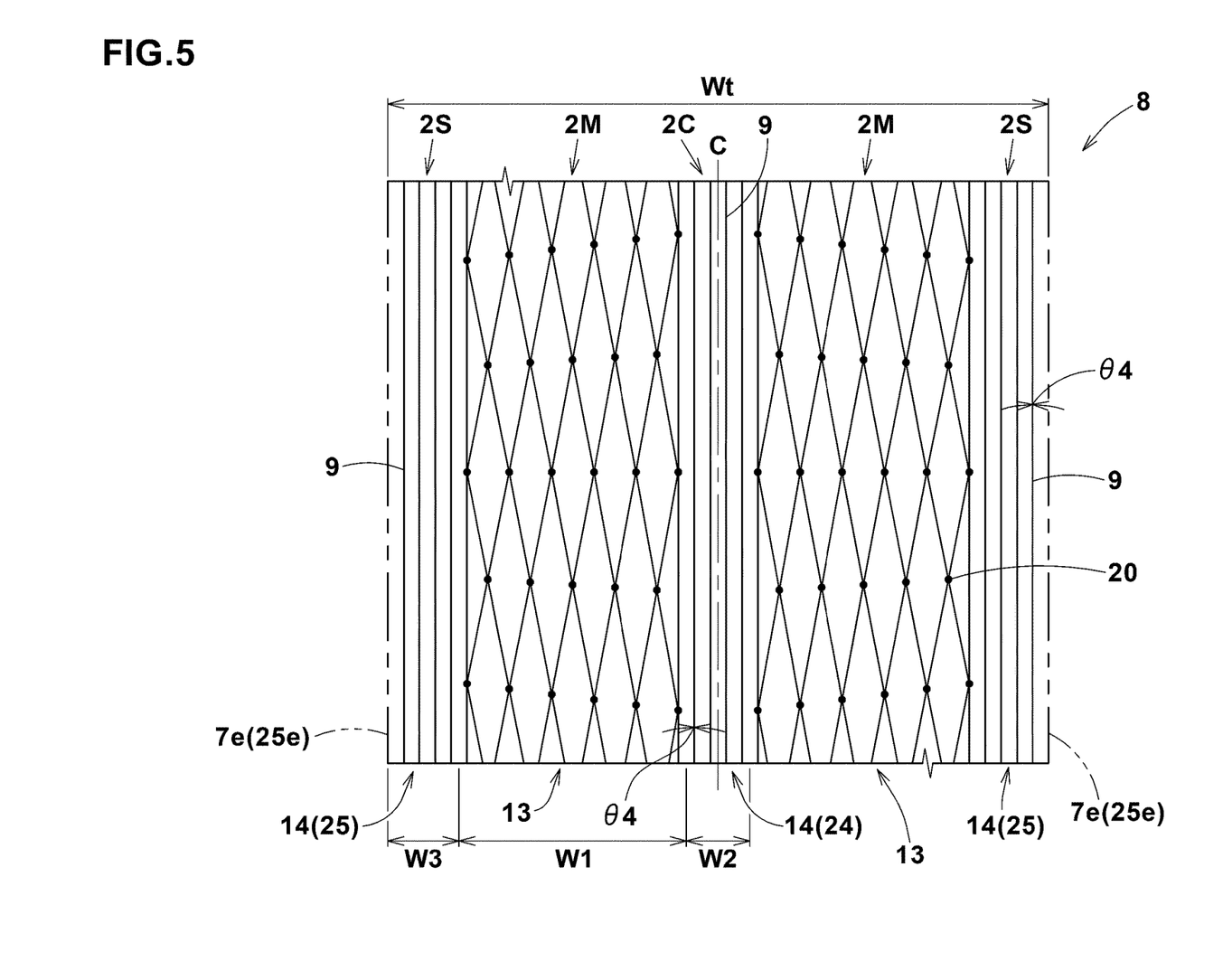
FIG. 5 is a developed schematic partial view of the tread reinforcing layer of the present embodiment.
Figure 6:
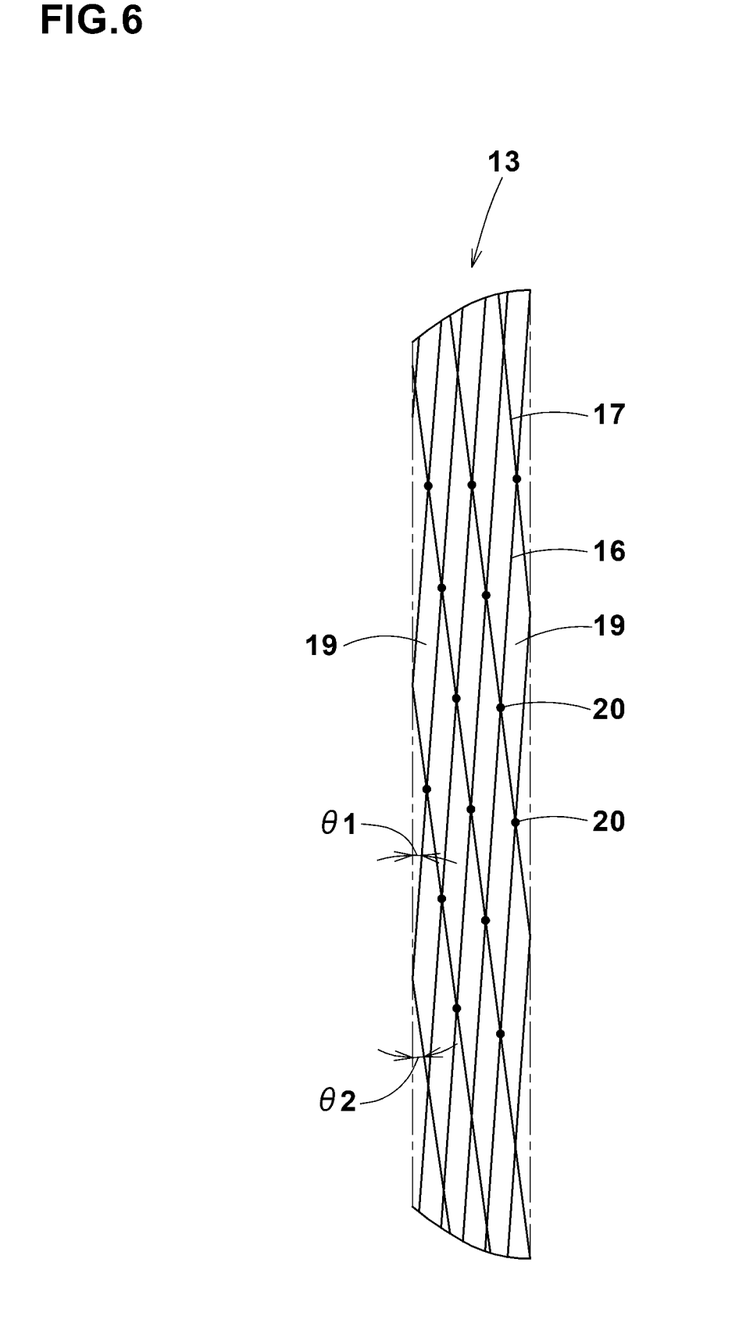
FIG. 6 is an developed schematic partial view of another example of the mesh part.

In FIG. 4 and also FIGS. 5 and 6, the rubberized cord strip 9 is indicated by a single line for convenience.

In the mesh part 13, the first inclined segments 16 are arranged so that their side edges 16s do not contact with each other, and also the second inclined segments 17 are arranged so that their side edges 17s do not contact with each other. And the first inclined segments 16 intersect the second inclined segments 17, leaving rectangular space parts 19. Of the intersecting first and second main segments 16 and 17, the radially outer main segments restrain the radially inner main segments and also the carcass at the positions of the intersections 20 of the first and second main segments 16 and 17. Thus, such mesh part 13 exerts high rigidity to produces a large cornering power. As a result, the cornering performance is improved.

The mesh part 13 has a tire-equator-side first region 13A, a tread-edge-side second region 13B and a third region 13C therebetween, wherein
the space parts 19a within the tire-equator-side first region 13A each have an area A1, the space parts 19b within the tread-edge-side second region 13B each have an area A2, and the space parts 19c within the third region 13C each have an area A3 smaller than the area A1 and larger than the area A2.

The number of the intersections 20 per unit area becomes larger in the region whose space parts 19 have a smaller area than in the region whose space parts 19 have a larger area. Therefore, the shearing stress and the rigidity become larger in the region on the tread edges TE side than in the region on the tire equator C side. As a result, light maneuverability is obtained and the uniformity is improved. Therefore, the tire 1 of the present embodiment exerts excellent cornering performance.

In the present embodiment, each of the axial widths wa, wb and wc of the respective regions 13A, 13B and 13C is ⅓ of the axial width WA of the mesh part 13.

Although not particularly limited, it is preferable that the area A1 of the space parts 19a is in a range from 102% to 110% of the area A3 of the space parts 19c, and the area A3 of the space parts 19c is in a range from 102% to 110% of the area A2 of the space parts 19b in order to effectively exhibit the above action.

It is preferable that the angle θ1 with respect to the tire circumferential direction of the first inclined segments 16 is in a range from 1 to 15 degrees, and the angle θ2 with respect to the tire circumferential direction of the second inclined segments 17 is in a range from 1 to 15 degrees. By setting the angles θ1, θ2 in this way, it is possible for the mesh part 13 to secure a high torsional rigidity and to exhibit excellent cornering performance. In the present embodiment, the angle θ1 is equal to the angle θ2. As a result, the space parts 19 are each formed in a diamond shape. Further, such angular relation is the same in the mesh parts 13 on both sides of the tire equator. Thus, the space parts 19 will produce cornering powers of equal magnitude when making right-turn and left-turn, which enables smooth turning.

In the mesh part 13, as the angles θ1 and θ2 are equal to each other, the intersecting portions 20 adjacent to each other in the tire axial direction are formed in substantially the same position in the tire circumferential direction.

In the present embodiment, the mesh part 13 comprises a plurality of circumferential segments 18 of the rubberized cord strip 9 which extend in the tire circumferential direction and which are disposed in one of or each of edge portions 13e of the mesh part 13. Such circumferential segments 18 effectively suppress the deformation of the carcass 6. In the present embodiment, the circumferential segments 18 are disposed in each of the edge portions 13e of the mesh part 13.

In the present embodiment, both ends in the tire circumferential direction of each circumferential segment 18 are respectively connected with one of the first inclined segments 16 and one of the second inclined segments 17. Such circumferential segment 18 reduces the bending stress acting on the rubberized cord strip 9 as compared with a case where the first inclined segment 16 and the second inclined segment 17 are directly connected to each other. As a result, lifting or separation of the directly connected portions from the underlying structure can be suppressed, and also lowering of the rigidity can be prevented.

Preferably, the angle θ3 of the circumferential segments 18 with respect to the tire circumferential direction is 5 degrees or less, more preferably 2 degrees or less. In the present embodiment, the angle θ3 is 0 degree.

In the above-said edge portion 13e, the circumferential segments 18 are arranged in line in the tire circumferential direction. In the present embodiment, there is no gap between the circumferentially adjacent circumferential segments 18, therefore, the circumferential segments 18 are arranged like a single strip 18A continuous in the tire circumferential direction. Such continuous arrangement greatly constrains the carcass 6, and the cornering performance may be improved. In the present embodiment, such continuous arrangement is made in both of the edge portions of the mesh part 13, therefore, the above-mentioned action is further exerted.

In the present embodiment, the circumferential segments 18 extends linearly.

However, in the present invention, the first inclined segments 16 may be connected smoothly to the second inclined segments 17 through arcuate curved portions (not shown) instead of the linear circumferential segments 18.

Further, in the present invention, the circumferential segments 18 may be omitted. In other words, the first inclined segments 16 may be directly connected to the second inclined segments 17 in each edge portion 13e of the mesh part 13.

In the present embodiment, the mesh part 13 is formed by winding one continuous rubberized cord strip 9, for example, such that a first inclined segment 16, a circumferential segment 18 on one side in the width direction, a second inclined segment 17, and a circumferential segment 18 on the other side in the width direction, are repeatedly formed in this order.

The mesh part 13 however may be formed from plural cut pieces of the rubberized cord strip 9.

FIG. 5 is a developed view of the cord-reinforced part 8 of the present embodiment. As shown, the cord-reinforced part 8 includes a spiral part 14 in addition to the mesh part 13. The spiral part 14 is formed from the rubberized cord strip 9 wound in a substantially spiral manner. Such a spiral part 14 can exert a large binding force on the carcass 6. The above expression "substantially spiral" means that one rubberized cord strip 9 is wound circumferentially of the tire at least one turn.

The angle θ4 of the rubberized cord strip 9 in the spiral part 14 with respect to the tire circumferential direction is set to be smaller than the angle θ1 of the first inclined segments 16 and smaller than the angle θ2 of the second inclined segments 17. For example, the angle θ4 is preferably not more than 5 degrees, more preferably not more than 2 degrees, inclusive of 0 degree.

In the present embodiment, the spiral part 14 includes a first spiral part 24 formed in the crown region 2c, and a second spiral part 25 formed in each of the shoulder regions 2s. Since the first spiral part 24 exerts a large binding force on the crown region 2c, it is possible to improve the high-speed stability performance during straight running. Since the second spiral parts 25 relatively reduce the torsional rigidity in the shoulder regions 2S, it is possible to generate smaller cornering power, therefore, the reaction force and vibrations caused by, for example, gaps of the road surface etc. are reduced, and ground-contact feeling may be improved. As a result, the second spiral parts 25 enables stable running when the motorcycle is fully leant, and the cornering performance can be improved.

In the present embodiment, the axially outer ends 25e of the second spiral parts 25 form the axially outer ends 7e of the tread reinforcing layer 7.

In the present embodiment, the first spiral part 24 and the second spiral parts 25 are each formed from one rubberized cord strip 9. Thereby, the above-described action is effectively exhibited.

However, each of the first spiral part 24 and the second spiral parts 25 may be formed from plural cut pieces of the rubberized cord strip 9.

In the present embodiment, the spiral part 14 is formed by winding the rubberized cord strip 9 such that the axially adjacent side edges 9s of the rubberized cord strip 9 contact with each other (not shown). Thereby, the variation in the mass distribution of the cord reinforced part 8 is reduced, and the uniformity is improved.

However, the spiral part 14 may be formed by winding the rubberized cord strip 9 such that the axially adjacent side edges 9s of the rubberized cord strip 9 partially overlap each other (not shown).

In the present embodiment, the axial width w1 of each of the mesh parts 13 measured along the tread surface 2a of the tread portion 2 is preferably not less than 20%, more preferably not less than 25%, but preferably not more than 48%, more preferably not more than 40% of the developed tread width TW. The axial width W2 of the first spiral part 24 measured along the tread surface 2a of is preferably not less than 3%, more preferably not less than 10%, but preferably not more than 30%, more preferably not more than 25% of the developed tread width TW.

The axial width W3 of each of the second spiral parts 25 measured along the tread surface 2a is preferably not less than 2%, more preferably not less than 7%, but preferably not more than 20%, more preferably not more than 15% of the developed tread width TW.

The cord-reinforced part 8 is not limited to the example as described above. For example, the mesh part 13 may be formed so as to extend over the crown region 2c and the middle regions 2M, or the mesh part 13 may be formed so as to extend over the shoulder region 2s and the middle region 2M, or the mesh part 13 may be formed so as to extend over the entire width of the tread reinforcing layer 7.

FIG. 6 shows a modification of the mesh part 13 shown in FIG. 4, wherein the angle θ1 of the first inclined segments 16 is different from the angle θ2 of the second inclined segments 17. Incidentally, the space parts 19 of such mesh part 13 are formed in a parallelogram shape rather than the diamond shape. As a result, the intersecting portions 20 are widely distributed in the tire circumferential direction, and the rigidity of the mesh part 13 is uniformed in the tire circumferential direction. This helps to improve the uniformity of the tire.

In order to effectively derive this effect, the difference |θ1−θ2| between the angles θ1 and θ2 is preferably not less than 1 degrees, more preferably not less than 2 degrees, still more preferably not less than 4 degrees, but preferably not more than 10 degrees more preferably not more than 8 degrees, still more preferably not more than 7 degrees.

While detailed description has been made of preferable embodiments of the present invention, the present invention can be embodied in various forms without being limited to the illustrated embodiments.

Comparison Tests

Motorcycle tires having the internal structure shown in FIG. 1 were experimentally manufactured as test tires (Practical examples Ex1-Ex7 and Comparative examples Ref1 and Ref2) and tested for the cornering performance.

The test tires had the specifications shown in Table 1, and common specifications are as follows.

Rubberized cord strip: width=4.0 mm, thickness=1.0 mm reinforcing cords: three steel cords Tread reinforcing layer: width Wt=90% of TW First spiral part: width W2=12% of width Wt of Tread reinforcing layer Mesh part: width W1=32% of width Wt of Tread reinforcing layer <Cornering Performance>

The test tires were mounted on front and rear wheels of a 1300 cc motorcycle. The motorcycle was run on a dry asphalt road in a test course, and the test rider evaluated the cornering performance based on the handle stability, maneuverability, vibrations due to circumferential nonuniformity, etc. The results are indicated in Table 1 by an index based on Ref1 being 100, wherein the larger value is better.

Front Wheel:

tire size 120/70ZR17, rim size 17M/CxMT3.50, tire pressure 250 kPa

Rear Wheel:

tire size 190/55ZR17, rim size 17M/CxMT5.50, tire pressure 250 kPa

TABLE 1

| Tire space parts | Ref1 | Ref2 | Ex1 | Ex2 | Ex3 | Ex4 | Ex5 | Ex6 | Ex7 |
|---|---|---|---|---|---|---|---|---|---|
| area ratio A1/A3 (%) | 100 | 105 | 105 | 110 | 112 | 105 | 105 | 105 | 105 |
| area ratio A3/A2 (%) | 100 | 100 | 105 | 110 | 112 | 105 | 105 | 105 | 105 |
| angle θ1 (deg.) | 7 | 7 | 5 | 5 | 5 | 5 | 5 | 5 | 5 |
| angle θ2 (deg.) | 7 | 7 | 10 | 10 | 10 | 5 | 9 | 12 | 15 |
| cornering performance | 100 | 102 | 115 | 113 | 110 | 110 | 115 | 115 | 113 |

From the test results, it was confirmed that the tires according to the present invention were improved in the cornering performance as compared with the comparative examples.

DESCRIPTION OF THE REFERENCE NUMERALS

1 Tire
7 tread reinforcing layer
8 cord-reinforced part
9 rubberized cord strip
13 mesh part
13A first region
13B second region
13C third region
19 space parts
C tire equator
TE tread edge

The invention claimed is:

1. A tire comprising:
a toroidal carcass, and
a tread reinforcing layer disposed radially outside the carcass in a tread portion, and comprising a cord-reinforced part formed by winding a rubberized cord strip with at least one reinforcing cord covered with a topping rubber,
wherein
the cord-reinforced part includes a mesh part in which the rubberized cord strip comprises first inclined segments and second inclined segments,
the first inclined segments incline toward one side with respect to the tire circumferential direction,
the second inclined segments incline to the opposite direction to the first inclined segments with respect to the tire circumferential direction,
side edges of the first inclined segments are arranged not to contact with one another,
side edges of the second inclined segments are arranged not to contact with one another, and
the first inclined segments intersect the second inclined segments, leaving space parts each having a quadrilateral shape,
wherein
the mesh part has a tire-equator-side first region, a tread-edge-side second region and a third region therebetween,
wherein the space parts within the tire-equator-side first region each have an area A1, the space parts within the tread-edge-side second region each have an area A2, and the space parts within the third region each have an area A3 smaller than the area A1 and larger than the area A2.

2. The tire according to claim 1, wherein
the angles of the first inclined segments and the second inclined segments with respect to the tire circumferential direction are in a range from 1 to 15 degrees.

3. The tire according to claim 1, wherein
in the mesh part, the rubberized cord strip comprises circumferential segments extending in the tire circumferential direction and arranged in at least one of edge portions in the tire axial direction of the mesh part, and
each of the circumferential segments is connected to one of the first inclined segments and one of the second inclined segments.

4. The tire according to claim 2, wherein
in the mesh part, the rubberized cord strip comprises circumferential segments extending in the tire circumferential direction and arranged in at least one of edge portions in the tire axial direction of the mesh part, and
each of the circumferential segments is connected to one of the first inclined segments and one of the second inclined segments.

5. The tire according to claim 1, wherein
in the mesh part, the rubberized cord strip comprises circumferential segments extending in the tire circumferential direction and arranged in each of edge portions in the tire axial direction of the mesh part, and
each of the circumferential segments is connected to one of the first inclined segments and one of the second inclined segments.

6. The tire according to claim 2, wherein
in the mesh part, the rubberized cord strip comprises circumferential segments extending in the tire circumferential direction and arranged in each of edge portions in the tire axial direction of the mesh part, and
each of the circumferential segments is connected to one of the first inclined segments and one of the second inclined segments.

7. The tire according to claim 1, wherein
with respect to the first inclined segment and the second inclined segment connected with the circumferential segment, the angle of the first inclined segment with respect to the circumferential segment is different from the angle of the second inclined segment with respect to the circumferential segment.

8. The tire according to claim 2, wherein
with respect to the first inclined segment and the second inclined segment connected with the circumferential segment, the angle of the first inclined segment with respect to the circumferential segment is different from the angle of the second inclined segment with respect to the circumferential segment.

9. The tire according to claim 3, wherein
with respect to the first inclined segment and the second inclined segment connected with the circumferential segment, the angle of the first inclined segment with respect to the circumferential segment is different from the angle of the second inclined segment with respect to the circumferential segment.

10. The tire according to claim 5, wherein
with respect to the first inclined segment and the second inclined segment connected with the circumferential segment, the angle of the first inclined segment with respect to the circumferential segment is different from the angle of the second inclined segment with respect to the circumferential segment.

11. The tire according to claim 1, wherein
the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

12. The tire according to claim 2, wherein
the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

13. The tire according to claim 3, wherein
the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

14. The tire according to claim 5, wherein
the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

15. The tire according to claim 7, wherein
the tread portion comprises a crown region including a tire equator and two middle regions disposed on both sides of the crown region,
the mesh part is disposed in each of the middle regions, and
the cord-reinforced part includes a first spiral part in which the rubberized cord strip extends substantially in a spiral manner and which is disposed in the crown region.

16. The tire according to claim 1, wherein
the tread portion comprises a crown region including a tire equator, two middle regions disposed on both sides of the crown region, and two shoulder regions respectively disposed axially outside the two middle regions,
the mesh part is disposed in each of the middle regions, and
the cord-reinforced part includes
a first spiral part in which the rubberized cord strip extends substantially in a spiral manner and which is disposed in the crown region, and
a second spiral part in which the rubberized cord strip extends substantially in a spiral manner and which is disposed in each of the shoulder regions.

17. The tire according to claim 2, wherein
the tread portion comprises a crown region including a tire equator, two middle regions disposed on both sides of the crown region, and two shoulder regions respectively disposed axially outside the two middle regions,
the mesh part is disposed in each of the middle regions, and
the cord-reinforced part includes
a first spiral part in which the rubberized cord strip extends substantially in a spiral manner and which is disposed in the crown region, and
a second spiral part in which the rubberized cord strip extends substantially in a spiral manner and which is disposed in each of the shoulder regions.

18. The tire according to claim 3, wherein
the tread portion comprises a crown region including a tire equator, two middle regions disposed on both sides of the crown region, and two shoulder regions respectively disposed axially outside the two middle regions,
the mesh part is disposed in each of the middle regions, and
the cord-reinforced part includes
a first spiral part in which the rubberized cord strip extends substantially in a spiral manner and which is disposed in the crown region, and
a second spiral part in which the rubberized cord strip extends substantially in a spiral manner and which is disposed in each of the shoulder regions.

19. The tire according to claim 5, wherein
the tread portion comprises a crown region including a tire equator, two middle regions disposed on both sides of the crown region, and two shoulder regions respectively disposed axially outside the two middle regions,
the mesh part is disposed in each of the middle regions, and
the cord-reinforced part includes
a first spiral part in which the rubberized cord strip extends substantially in a spiral manner and which is disposed in the crown region, and
a second spiral part in which the rubberized cord strip extends substantially in a spiral manner and which is disposed in each of the shoulder regions.

20. The tire according to claim 7, wherein
the tread portion comprises a crown region including a tire equator, two middle regions disposed on both sides of the crown region, and two shoulder regions respectively disposed axially outside the two middle regions,
the mesh part is disposed in each of the middle regions, and
the cord-reinforced part includes
a first spiral part in which the rubberized cord strip extends substantially in a spiral manner and which is disposed in the crown region, and
a second spiral part in which the rubberized cord strip extends substantially in a spiral manner and which is disposed in each of the shoulder regions.

* * * * *